(12) United States Patent
Gu

(10) Patent No.: US 11,697,733 B2
(45) Date of Patent: Jul. 11, 2023

(54) THERMOPLASTIC POLYURETHANE COMPOUNDS EXHIBITING STAIN RESISTANCE AND ENHANCED UV STABILITY

(71) Applicant: PolyOne Corporation, Avon Lake, OH (US)

(72) Inventor: Jiren Gu, Crystal Lake, IL (US)

(73) Assignee: Avient Corporation, Avon Lake, OH (US)

( * ) Notice: Subject to any disclaimer, the term of this patent is extended or adjusted under 35 U.S.C. 154(b) by 29 days.

(21) Appl. No.: 16/735,326

(22) Filed: Jan. 6, 2020

(65) Prior Publication Data

US 2020/0216665 A1 Jul. 9, 2020

Related U.S. Application Data

(60) Provisional application No. 62/790,278, filed on Jan. 9, 2019.

(51) Int. Cl.

| | |
|---|---|
| *C08L 75/06* | (2006.01) |
| *C08K 5/00* | (2006.01) |
| *B29C 48/00* | (2019.01) |
| *B29K 75/00* | (2006.01) |
| *B29L 31/34* | (2006.01) |
| *B29L 31/00* | (2006.01) |

(52) U.S. Cl.
CPC .......... *C08L 75/06* (2013.01); *B29C 48/0021* (2019.02); *C08K 5/005* (2013.01); *C08K 5/0016* (2013.01); *B29K 2075/00* (2013.01); *B29L 2031/3437* (2013.01); *B29L 2031/7162* (2013.01); *C08L 2201/08* (2013.01); *C08L 2203/20* (2013.01)

(58) Field of Classification Search
CPC .. C08L 75/06; C08L 2203/20; C08L 2201/08; C08K 5/005; B29K 2075/00
See application file for complete search history.

(56) References Cited

U.S. PATENT DOCUMENTS

| | | | |
|---|---|---|---|
| 4,124,572 A | 11/1978 | Mao | |
| 4,393,186 A | 7/1983 | Damico et al. | |
| 4,608,418 A | 8/1986 | Czerwinski et al. | |
| 4,975,207 A * | 12/1990 | Lee | C08L 75/04 525/66 |
| 5,028,658 A | 7/1991 | David et al. | |
| 5,162,461 A | 11/1992 | Skochdopole et al. | |
| 5,491,194 A * | 2/1996 | Henton | C08G 18/3212 525/66 |
| 5,516,857 A | 5/1996 | Mann | |
| 6,342,047 B1 | 1/2002 | Urakawa et al. | |
| 8,296,974 B2 | 10/2012 | Sonnenschein et al. | |
| 9,788,620 B1 * | 10/2017 | Parkinson | A45C 13/008 |
| 10,253,180 B2 | 4/2019 | Boucard et al. | |
| 2003/0109623 A1 | 6/2003 | Gornowicz et al. | |
| 2003/0166794 A1 * | 9/2003 | Muehlfeld | C08L 75/06 525/453 |
| 2009/0149622 A1 | 6/2009 | Sonnenschein et al. | |
| 2010/0160545 A1 | 6/2010 | Page | |
| 2011/0275733 A1 * | 11/2011 | Prissok | C08G 18/0895 523/100 |
| 2013/0020744 A1 | 1/2013 | Welker et al. | |
| 2013/0101775 A1 | 4/2013 | Dennison et al. | |
| 2013/0216738 A1 | 8/2013 | Owusu et al. | |
| 2014/0141214 A1 | 5/2014 | Steelman et al. | |
| 2014/0154505 A1 | 6/2014 | Steelman et al. | |
| 2015/0306845 A1 | 10/2015 | Dollase et al. | |
| 2015/3006845 | 10/2015 | Dollase et al. | |
| 2017/0233572 A1 | 8/2017 | Boucard et al. | |
| 2020/0040182 A1 | 2/2020 | Venkataswamy et al. | |
| 2021/0017416 A1 | 1/2021 | Johansson et al. | |

FOREIGN PATENT DOCUMENTS

| | | |
|---|---|---|
| CN | 1662605 A | 8/2005 |
| CN | 101955646 A | 1/2011 |
| CN | 102762374 A | 10/2012 |
| CN | 106103527 A | 11/2016 |
| CN | 107129674 A | 9/2017 |
| CN | 108003602 A | 5/2018 |
| CN | 108017900 A | 5/2018 |
| CN | 108084392 A | 5/2018 |
| CN | 108102241 A | 6/2018 |

(Continued)

OTHER PUBLICATIONS

Khanna, A.S.; High-Performance Organic Coatings, 2008, p. 3-26.*
Huntsman; A Guide to Thermoplastic Polyurethanes (TPU), 2010, p. 1-26.*
English translation of First Office Action, CN Application No. 202080008351.0, dated Sep. 9, 2022, p. 1-8.

(Continued)

*Primary Examiner* — Alicia Bland

(74) *Attorney, Agent, or Firm* — Michael J. Sambrook; Emily E. Vlasek; David V. Monateri

(57) ABSTRACT

Thermoplastic articles are molded from thermoplastic polyurethane compounds including blends of aromatic polycaprolactone thermoplastic polyurethane and aliphatic polycaprolactone thermoplastic polyurethane. The thermoplastic articles can have enhanced stability against exposure to ultraviolet (UV) light relative to thermoplastic articles molded from thermoplastic polyurethane compounds including only aromatic polycaprolactone thermoplastic polyurethane as the thermoplastic polyurethane component. Additionally, the thermoplastic articles can have good stain resistance, good clarity (i.e., low haze), and other desirable properties.

15 Claims, No Drawings

(56) References Cited

FOREIGN PATENT DOCUMENTS

| | | |
|---|---|---|
| CN | 108368226 A | 8/2018 |
| CN | 108456416 A | 8/2018 |
| DE | 102006036539 A1 | 2/2008 |
| EP | 0024245 A1 | 2/1981 |
| EP | 3620478 A1 | 3/2020 |
| JP | 2000319502 A | 11/2000 |
| WO | 9500590 A2 | 1/1995 |
| WO | 9513307 A1 | 5/1995 |
| WO | 2009155294 A2 | 12/2009 |
| WO | 2011091132 A2 | 7/2011 |
| WO | 2012145465 A1 | 10/2012 |
| WO | 2014058446 A1 | 4/2014 |
| WO | 2018029131 A1 | 2/2018 |
| WO | 2018141750 A1 | 8/2018 |
| WO | 2018164235 A1 | 9/2018 |
| WO | 2020024242 A1 | 2/2020 |
| WO | 2020048881 A1 | 3/2020 |
| WO | 2020146301 A1 | 7/2020 |
| WO | 2020146311 A1 | 7/2020 |
| WO | 2020146323 A1 | 7/2020 |

OTHER PUBLICATIONS

Lanina, S Y, et al.: Assessment of the chemical risk factor for application of artificial cardiac pacemakers equipped with a head made of thermoplastic polyurethane compound, Inorganic Materials: Applied Research, Pleiades Publishing, Moscow, vol. 7, No. 5, 2016, p. 737-744 (XP36072795A).

Huntsman: Stretching the possibilities TPU elastomers for Film & Sheet applications, 2019, p. 1-7 (XP55944187A).

* cited by examiner

THERMOPLASTIC POLYURETHANE COMPOUNDS EXHIBITING STAIN RESISTANCE AND ENHANCED UV STABILITY

CLAIM OF PRIORITY

This application claims the benefit of U.S. Provisional Patent Application Ser. No. 62/790,278 and filed on Jan. 9, 2019, which is hereby incorporated by reference in its entirety.

FIELD OF THE INVENTION

This invention relates to thermoplastic polyurethane compounds and thermoplastic articles formed therefrom that have enhanced stability against exposure to ultraviolet (UV) light, while also exhibiting good resistance to abrasion and staining, good clarity, and other desirable properties.

BACKGROUND OF THE INVENTION

Demand exists for polymeric materials that are useful for making protective cases and other components or accessories for personal electronic devices such as smart phones, tablets, and handheld computers.

Protective cases for personal electronic devices typically require good aesthetics such as "look" and "feel" that are desirable to consumers. For example, some consumers prefer the look of protective cases that are relatively clear in appearance or that are lightly or brightly colored. Further, some consumers prefer the feel of protective cases that are relative soft to the touch without being sticky or tacky.

Thermoplastic elastomers (TPE), which are polymeric materials that exhibit elasticity while remaining thermoplastic, can be useful for making protective cases for personal electronic devices. TPEs can include styrenic block copolymers (SBC), thermoplastic vulcanizates (TPV), thermoplastic polyolefins (TPO), copolyesters (COPE), thermoplastic polyurethanes (TPU), copolyamides (COPA), olefinic block copolymers (OBC). Although certain TPEs, such as conventional TPUs, can offer good clarity and other properties desirable for making protective cases for personal electronic devices, drawbacks still exist.

For example, protective cases made from conventional TPUs can suffer from poor resistance to abrasion and staining when personal electronic devices are placed by users in garments or clothing articles made from denim or other dyed fabrics, such as in a pocket of blue jeans. Disadvantageously, it is possible for such protective cases to be abraded by the fabric and stained by dye that transfers from the fabric. Such abrasion and staining is especially problematic when protective cases are clear or lightly or brightly colored.

Additionally, protective cases made from conventional TPUs can exhibit poor stability against exposure to ultraviolet (UV) light. Disadvantageously, such poor UV stability can manifest as yellowing or other color changing in the protective cases. As with abrasion and staining, such yellowing or other color changing is especially problematic when protective cases are clear or lightly or brightly colored.

SUMMARY OF THE INVENTION

Consequently, a need exists for thermoplastic polyurethane compounds and thermoplastic articles molded therefrom that have enhanced stability against exposure to ultraviolet (UV) light, while also exhibiting good resistance to abrasion and staining, good clarity, and other desirable properties.

The aforementioned needs are met by one or more aspects of the present invention.

Surprisingly, it has been found that, by blending aliphatic polycaprolactone thermoplastic polyurethane with aromatic polycaprolactone thermoplastic polyurethane, it is possible to provide thermoplastic polyurethane compounds and thermoplastic articles formed therefrom having good resistance to abrasion and staining, good clarity, and other desirable properties, while also achieving enhanced UV stability.

Some aspects of the invention are directed to thermoplastic polyurethane compounds including blends of aromatic polycaprolactone thermoplastic polyurethane and aliphatic polycaprolactone thermoplastic polyurethane.

Other aspects of the invention are directed to thermoplastic articles molded from thermoplastic polyurethane compounds including blends of aromatic polycaprolactone thermoplastic polyurethane and aliphatic polycaprolactone thermoplastic polyurethane.

Further aspects of the invention are directed to methods of making thermoplastic articles. The methods include steps of providing thermoplastic polyurethane compounds as described herein, and molding the thermoplastic polyurethane compounds to provide the thermoplastic articles.

Even further aspects of the invention are directed to methods of improving stability against exposure to ultraviolet (UV) light by thermoplastic articles molded from thermoplastic polyurethane compounds. The methods include a step of selecting blends of aromatic polycaprolactone thermoplastic polyurethane and aliphatic polycaprolactone thermoplastic polyurethane to provide the thermoplastic polyurethane compounds as described herein to form the thermoplastic articles as described herein.

Features of the invention will become apparent with reference to the following embodiments. There exist various refinements of the features noted in relation to the above-mentioned aspects of the disclosed invention. Additional features may also be incorporated in the above-mentioned aspects of the disclosed invention. These refinements and additional features may exist individually or in any combination. For instance, various features discussed below in relation to any of the described aspects of the invention may be incorporated into any of the described aspects of the invention alone or in any combination.

EMBODIMENTS OF THE INVENTION

In some embodiments, the invention is directed to thermoplastic polyurethane compounds. In other embodiments, the invention is directed to thermoplastic articles molded from thermoplastic polyurethane compounds. In further embodiments, the invention is directed to methods of making thermoplastic articles. In even further embodiments, the invention is directed to methods of improving stability against exposure to ultraviolet (UV) light by thermoplastic articles molded from thermoplastic polyurethane compounds. Required and optional features of these and other embodiments of the disclosed invention are described.

As used herein, "aliphatic polycaprolactone thermoplastic polyurethane" means a type of thermoplastic polyurethane that is a reaction product of reactants including a polycaprolactone polyol and an aliphatic diisocyanate and, optionally, chain extender.

As used herein, "aliphatic polyester thermoplastic polyurethane" means a type of thermoplastic polyurethane that is a reaction product of reactants including a polyester polyol (other than polycaprolactone polyol) and an aliphatic diisocyanate and, optionally, chain extender.

As used herein, "aliphatic polyether thermoplastic polyurethane" means a type of thermoplastic polyurethane that is a reaction product of reactants including a polyether polyol and an aliphatic diisocyanate and, optionally, chain extender.

As used herein, "aromatic polycaprolactone thermoplastic polyurethane" means a type of thermoplastic polyurethane that is a reaction product of reactants including a polycaprolactone polyol and an aromatic diisocyanate and, optionally, chain extender.

As used herein, "aromatic polyester thermoplastic polyurethane" means a type of thermoplastic polyurethane that is a reaction product of reactants including a polyester polyol (other than polycaprolactone polyol) and an aromatic diisocyanate and, optionally, chain extender.

As used herein, "aromatic polyether thermoplastic polyurethane" means a type of thermoplastic polyurethane that is a reaction product of reactants including a polyether polyol and an aromatic diisocyanate and, optionally, chain extender.

As used herein, the term "Blue Jean Abrasion Test" means the Ford Laboratory Test Method (FLTM) BN 107-01 Crocking Test as performed with equipment, set-up, materials, and conditions as follows:

- Instrument: TABER Linear Abraser—Model 5750;
- Accessory: TABER Crockmeter Attachment with 16 mm Acrylic Finger;
- Abradant: LEVI'S 505 Regular Cut Blue Jeans (circular cloth cut with shears from the lower part of the jean leg and positioned on the finger of the Crockmeter such that the weave is oblique to the direction of rubbing and affixed on the finger with a retaining clip);
- Stroke Length: 4 inches (100 mm);
- Cycle Speed: 60 cycles per minute;
- Load: 9 Newtons (918 grams); and
- Conditions: Temperature of 76° F. (24.4° C.) and Relative Humidity of 47% (with test specimens conditioned at least 24 hours);
- Ratings: 1=No Blue Jean Staining after both 100 cycles and 500 cycles; 2=No Blue Jean Staining after 100 cycles but Blue Jean Staining after 500 cycles; 3=Blue Jean Staining after both 100 cycles and 500 cycles.

As used herein, the term "Blue Jean Staining" means abrasion or discoloration from color transfer visually observable on a test specimen, such as a thermoplastic article, after subjecting the test specimen to the Blue Jean Abrasion Test.

As used herein, "clarity" means a qualitative determination made by visually observing and comparing a specimen plaque molded at a thickness of 1.5 mm from a specimen thermoplastic polyurethane compound against a control plaque molded at a thickness of 1.5 mm from neat IROGRAN A 85 P 4394 UV aliphatic polycaprolactone thermoplastic polyurethane available from Huntsman. Ratings are assigned according to the following criteria: 1=specimen is comparable in clarity relative to the control; 2=specimen is hazy relative to the control; 3=specimen is opaque relative to the control.

As used herein, the term "compound" means a composition or mixture resulting from melt mixing, or compounding, a neat polymer and at least one other ingredient including but not limited to one or more additives, or one or more other polymers, or both.

As used herein, "Delta E" means a perceived color difference within the CIELAB color space and under D65 illuminant as measured according to ASTM E1347-6 using a COLOR EYE 7000A instrument available from Macbeth (X-Rite).

As used herein, "haze" is a measure of loss of clarity as measured according to ASTM D1003. Clarity also can be assessed qualitatively by visual observation.

As used herein, the term "free of" a certain component or substance means, in some embodiments, that no amount of that component or substance is intentionally present, and, in other embodiments, that no functionally effective amount of that component or substance is present, and, in further embodiments, that no amount of that component or substance is present.

As used herein, the term "molded from" means, with respect to an article (or component of an article) and a material, that the article (or component of the article) is molded, extruded, shaped, formed, or otherwise made from the material. As such, the term "molded from" means, in some embodiments, the article (or component of an article) can comprise, consist essentially of, or consist of, the material; and, in other embodiments, the article (or component of an article) consists of the material because the article (or component of an article) is, for example, made by an injection molding process.

As used herein, the term "QUV Test" means an accelerated weathering test as performed according to ASTM E1347-06 with equipment and conditions as follows:

- Equipment: QUV/Spray Accelerated Weathering Tester available from Q-Lab;
- UV Irradiance: 0.68 W/m$^2$;
- Temperature: 45° C.; and
- Duration: 14 days.

As used herein, the term "visually observable" (including "visual observation" and other like terms) means observable (or an observation made) by an unaided human eye under common interior lighting conditions at a distance no greater than 50 centimeters from the unaided human eye.

As used herein, the term "Yellow Index" means a rating of yellowness measured according to ASTM E313 using a COLOR EYE 7000A instrument available from Macbeth (X-Rite).

Thermoplastic Polyurethane Compounds and Molded Articles

Some aspects of the invention are directed to thermoplastic polyurethane compounds. Other aspects of the invention are directed to thermoplastic articles molded from the thermoplastic polyurethane compounds.

According to the invention, thermoplastic polyurethane compounds include blends of aromatic polycaprolactone thermoplastic polyurethane and aliphatic polycaprolactone thermoplastic polyurethane, wherein at least about 50 parts by weight is the aromatic polycaprolactone thermoplastic polyurethane.

For example, in some embodiments, the thermoplastic polyurethane compounds include blends of aromatic polycaprolactone thermoplastic polyurethane and aliphatic polycaprolactone thermoplastic polyurethane, wherein from about 60 to about 90 parts by weight is the aromatic polycaprolactone thermoplastic polyurethane and from about 10 to about 40 parts by weight is the aliphatic polycaprolactone thermoplastic polyurethane.

In some embodiments, the thermoplastic polyurethane compounds further include additives selected from antioxidants and stabilizers; colorants; mold release agents; processing aids; ultraviolet light absorbers; and combinations thereof.

In some embodiments, the thermoplastic polyurethane compounds further include secondary polymer selected from styrenic block copolymers, thermoplastic vulcanizates, polyolefin elastomers, copolyesters, and combinations thereof.

In some embodiments, the thermoplastic polyurethane compound further includes plasticizer.

In some embodiments, the thermoplastic polyurethane compounds are free of other aromatic thermoplastic polyurethane selected from aromatic polyester thermoplastic polyurethane, aromatic polyether thermoplastic polyurethane, and combinations thereof.

In some embodiments, the thermoplastic polyurethane compounds are free of other aliphatic thermoplastic polyurethane selected from aliphatic polyester thermoplastic polyurethane, aliphatic polyether thermoplastic polyurethane, and combinations thereof.

Surprisingly, it has been found that it is possible to improve stability against exposure to ultraviolet (UV) light for a thermoplastic article molded from a thermoplastic polyurethane compound when the thermoplastic polyurethane compound includes blends of aliphatic polycaprolactone thermoplastic polyurethane with aromatic polycaprolactone thermoplastic polyurethane, while maintaining good stain resistance, good clarity (i.e., low haze), and other desirable properties.

UV stability of the thermoplastic article molded from blends of aromatic polycaprolactone thermoplastic polyurethane and aliphatic polycaprolactone thermoplastic polyurethane according to the disclosed invention is enhanced relative to the UV stability of thermoplastic article molded from a thermoplastic polyurethane compound including only aromatic polycaprolactone thermoplastic polyurethane as the thermoplastic polyurethane component. UV stability can be assessed by Delta E and Yellow Index for a thermoplastic article after subjected to QUV Test.

For example, in some embodiments, the thermoplastic article, after subjected to QUV Test, achieves (a) a Delta E lower than a comparative Delta E, and (b) a Yellow Index lower than a comparative Yellow Index. The comparative Delta E and the comparative Yellow Index are achieved by a comparative thermoplastic article after subjected to QUV Test. The comparative thermoplastic article is molded from a comparative thermoplastic polyurethane compound. The comparative thermoplastic polyurethane compound is identical to the thermoplastic polyurethane compound, except that the comparative thermoplastic polyurethane compound includes 100 parts by weight of thermoplastic polyurethane selected from aromatic polycaprolactone thermoplastic polyurethane only.

In some embodiments, the thermoplastic polyurethane compounds include from about 0.1 to about 2 parts by weight of ultraviolet light absorber, and the thermoplastic articles molded therefrom, after subjected to QUV Test, can achieve a Delta E of less than about 5.5 and a Yellow Index of less than about 8.5.

In other embodiments, the thermoplastic articles, after subjected to QUV Test, can achieve a Delta E of less than about 5.0, or less than about 3.0, or less than about 2.0.

In further embodiments, the thermoplastic articles, after subjected to QUV Test, can achieve a Yellow Index of less than about 7.5, or less than about 4.0, or less than about 2.5.

In some embodiments, the thermoplastic articles can achieve a rating of 1 according to Blue Jean Abrasion Test.

Blends of Polycaprolactone Thermoplastic Polyurethanes

In general, thermoplastic polyurethanes (TPUs) are block copolymers composed of hard segments and soft segments. The hard segment is built from the reaction of an isocyanate and a chain extender or short-chain diol. The soft segment is built from the reaction of an isocyanate and a polyol or long-chain diol. TPUs can be categorized into two groups based on the chemistry of the isocyanate component: (1) aromatic, and (2) aliphatic. Additionally, TPUs can be classified into three classes based on the chemistry of the soft segment: (1) polyester, (2) polyether, and (3) polycaprolactone.

According to the invention, thermoplastic polyurethane compounds include blends of aromatic polycaprolactone thermoplastic polyurethane and aliphatic polycaprolactone thermoplastic polyurethane.

Suitable aromatic polycaprolactone thermoplastic polyurethanes include conventional or commercially available aromatic polycaprolactone thermoplastic polyurethanes. A single commercial grade of aromatic polycaprolactone thermoplastic polyurethane or a combination of two or more different commercial grades of aromatic polycaprolactone thermoplastic polyurethane can be used as the aromatic polycaprolactone thermoplastic polyurethane in the disclosed invention.

Non-limiting examples of commercially available aromatic polycaprolactone thermoplastic polyurethanes include those under the PEARLTHANE brand, such as grade 11T85, available from Lubrizol, and those under the ESTANE brand, such as grades 2102-90A and 2102-55D, also available from Lubrizol.

Suitable aliphatic polycaprolactone thermoplastic polyurethanes include conventional or commercially available aliphatic polycaprolactone thermoplastic polyurethanes. A single commercial grade of aliphatic polycaprolactone thermoplastic polyurethane or a combination of two or more different commercial grades of aliphatic polycaprolactone thermoplastic polyurethane can be used as the aliphatic polycaprolactone thermoplastic polyurethane in the disclosed invention.

Non-limiting examples of commercially available aliphatic polycaprolactone thermoplastic polyurethanes include those under the KRYSTALGRAN brand, such as grade PN03-221, available from Huntsman, and those under the ESTANE brand, such as grades 2102-90A and 2102-55D, available from Lubrizol.

Optional Additives

In some embodiments, the thermoplastic polyurethane compounds further include one or more optional additives.

Suitable optional additives include conventional or commercially available plastics additives. Those skilled in the art of thermoplastics compounding, without undue experimentation, can select suitable additives from available references, for example, E. W. Flick, "Plastics Additives Database," *Plastics Design Library* (Elsevier 2004).

Optional additives can be used in any amount that is sufficient to obtain a desired processing or performance property for the thermoplastic polyurethane compound and/or the thermoplastic article molded therefrom. The amount should not be wasteful of the additive nor detrimental to the processing or performance of the thermoplastic polyurethane compound and/or the thermoplastic article molded therefrom.

Non-limiting examples of optional additives include adhesion promoters; anti-fogging agents; antioxidants; anti-static agents; biocides (antibacterials, fungicides, and mildewcides); colorants including pigments and dyes; dispersants; fillers and extenders; fire and flame retardants and smoke suppressants; hardness adjusters; impact modifiers; initiators; lubricants; micas; mold release agents; oils and plasticizers; processing aids; secondary polymers; silanes, titanates and zirconates; slip and anti-blocking agents; stabilizers; stearates; ultraviolet light absorbers; viscosity regulators; and waxes.

In some embodiments, the thermoplastic polyurethane compounds further include one or more of antioxidants and stabilizers; colorants; mold release agents; ultraviolet light absorbers; and combinations thereof.

Optional Secondary Polymer

In some embodiments, the thermoplastic polyurethane compounds further include secondary polymer (i.e., polymer resin other than the thermoplastic polyurethane component).

Secondary polymer should be compatible with the thermoplastic polyurethane and can, for example, contribute to improved processability or desirable physical properties, such as hardness, in the thermoplastic polyurethane compound.

Suitable secondary polymer includes thermoplastic elastomers other than thermoplastic polyurethanes, such as styrenic block copolymers, thermoplastic vulcanizates, polyolefin elastomers, copolyesters, and combinations thereof.

Non-limiting examples of suitable styrenic block copolymers include styrene-ethylene/butylene-styrene (SEBS), styrene-ethylene/propylene-styrene (SEPS), styrene-ethylene/ethylene/propylene-styrene (SEEPS), styrene-isobutylene-styrene (SIBS), styrene-butadiene-styrene (SBS), styrene-isoprene-styrene (SIS), and combinations thereof.

Non-limiting examples of suitable thermoplastic vulcanizate (TPV) include blends of a continuous phase of a polyolefin such as polypropylene and a discontinuous phase of a vulcanized rubber such as crosslinked EPDM.

Non-limiting examples of suitable polyolefin elastomer include propylene-based elastomers, ethylene/α-olefin random copolymers, and combinations thereof.

Non-limiting examples of suitable copolyesters include block copolymers composed from repeating soft segments of aliphatic polyether or aliphatic polyester and hard segments of aromatic polyester.

Optional Plasticizer

In some embodiments, especially when thermoplastic elastomer other than thermoplastic polyurethane is included as secondary polymer, the thermoplastic polyurethane compounds further include plasticizer.

Plasticizer can be used, for example, to adjust softness and/or improve flow or other properties of the thermoplastic polyurethane compound.

Any conventional oil capable of plasticizing styrenic block copolymer, such as mineral oil, vegetable oil, synthetic oil, etc., can be used in the present invention. Examples of commercially available oils include those available under the PURETOL 380 brand from Petro-Canada, and those available under the PRIMOL 382 brand from ExxonMobil.

Ranges of Ingredients in the TPU Compounds

Table 1 below shows ranges of ingredients, in parts by weight, which can be acceptable, desirable, and preferable for some embodiments of thermoplastic polyurethane (TPU) compounds of the disclosed invention. Other possible ranges of ingredients for other embodiments of the disclosed invention are as described elsewhere herein.

Thermoplastic polyurethane compounds, in some embodiments, can comprise, consist essentially of, or consist of these ingredients. Any number between the ends of the ranges is also contemplated as an end of a range, such that all possible combinations are contemplated within the possibilities of Table 1 as embodiments of compounds for use in the disclosed invention. Unless expressly stated otherwise herein, any disclosed number is intended to refer to both exactly the disclosed number and "about" the disclosed number, such that either possibility is contemplated within the possibilities of Table 1 as embodiments of compounds for use in the disclosed invention.

TABLE 1

Thermoplastic Polyurethane Compounds
(Parts by Weight)

| Ingredient | Acceptable | Desirable | Preferable |
|---|---|---|---|
| Aromatic Polycaprolactone TPU | 50-99 | 60-90 | 65-75 |
| Aliphatic Polycaprolactone TPU | 1-50 | 10-40 | 25-35 |
| Optional Additives | 0-20 | 0-10 | 0-5 |
| Optional Secondary Polymer | 0-200 | 0-150 | 0-100 |
| Optional Plasticizer | 0-400 | 0-300 | 0-200 |

Processing and Methods of Making

Preparation of thermoplastic polyurethane compounds of the disclosed invention is uncomplicated once the proper ingredients have been selected. The compound can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), for example, from about 250 rpm to about 350 rpm. Typically, the output from the extruder is pelletized for later processing into thermoplastic articles.

Subsequent preparation of thermoplastic articles of the disclosed invention also is uncomplicated once thermoplastic polyurethane compounds of the present invention are provided. For example, thermoplastic articles of the present invention can be made by injection molding, extrusion, blow molding, rotational molding, thermoforming, calendering, and the like.

Processing techniques are described in available references, for example, Dominick V. Rosato et al., Plastics Design Handbook (Springer 2013).

In some embodiments, thermoplastic elastomer compounds of the disclosed invention are molded by injection molding processes into thermoplastic articles.

Further aspects of the invention are directed to overmolded articles made by overmolding processes.

According to the invention, the overmolded articles include (a) an overmold portion including the thermoplastic article of any embodiments of the disclosed invention, and (b) a substrate portion molded from a thermoplastic resin compound. The overmold portion is bonded onto the substrate portion at a bond interface, and the bond interface is free of adhesive. The thermoplastic resin compound includes a thermoplastic resin and optionally additives. Non-limiting examples of suitable thermoplastic resins include polyamides, polycarbonates (PC), acrylonitrile butadiene styrene (ABS), polycarbonate/acrylonitrile butadiene styrene (PC/ABS), styrene-acrylonitrile (SAN), and the like.

Methods of Improving UV Stability

Some aspects of the invention are directed to methods of improving stability against ultraviolet light exposure by a thermoplastic article molded from a thermoplastic polyurethane compound including 100 parts by weight of thermoplastic polyurethane.

UV stability is improved relative to the UV stability of a thermoplastic article molded from a thermoplastic polyurethane compound including only aromatic polycaprolactone thermoplastic polyurethane as the thermoplastic polyurethane component. UV stability can be assessed by Delta E and Yellow Index for a thermoplastic article after subjected to QUV Test as described herein above.

According to the invention, the methods include the step of selecting the thermoplastic polyurethane from blends of aromatic polycaprolactone thermoplastic polyurethane and aliphatic polycaprolactone thermoplastic polyurethane, wherein at least about 50 parts by weight is the aromatic polycaprolactone thermoplastic polyurethane.

For example, in some embodiments, the methods include the step of selecting blends of aromatic polycaprolactone thermoplastic polyurethane and aliphatic polycaprolactone thermoplastic polyurethane, wherein from about 60 to about 90 parts by weight is the aromatic polycaprolactone thermoplastic polyurethane and from about 10 to about 40 parts by weight is the aliphatic polycaprolactone thermoplastic polyurethane.

In other embodiments, the methods include providing the thermoplastic polyurethane compounds of any embodiments of the disclosed invention. In further embodiments, the methods include molding the thermoplastic articles from the thermoplastic polyurethane compounds of any embodiments of the disclosed invention.

For example, in some embodiments, the thermoplastic polyurethane compounds include from about 0.1 to about 2 parts by weight of ultraviolet light absorber, and the thermoplastic articles molded therefrom, after subjected to QUV Test, can achieve a Delta E of less than about 5.5 and a Yellow Index of less than about 8.5.

USEFULNESS OF THE INVENTION

Thermoplastic polyurethane compounds of the disclosed invention can be useful for making any type of thermoplastic article, or any thermoplastic component of a multi-component article or device, for which properties such as enhanced UV stability, good resistance to abrasion and staining, and good clarity are desirable or required.

Thermoplastic polyurethane compounds of the disclosed invention have potential for use in applications in many different industries, including but not limited to: automotive and transportation; consumer products; electronics; healthcare and medical; household appliances; and other industries or applications benefiting from the unique combination of properties.

In some embodiments, thermoplastic polyurethane compounds of the present invention can be especially useful for making protective cases for personal electronic devices such as smart phones or other devices that a user frequently places into and removes from a garment or clothing article made from denim or other dyed fabric, such as a pocket of blue jeans.

Some aspects of the invention are directed to electronic devices including the thermoplastic articles as described herein.

Other aspects of the invention are directed to accessories for an electronic device wherein the accessories include the thermoplastic articles as disclosed herein. In some embodiments, the accessory is a protective case for a handheld electronic device.

EXAMPLES

Non-limiting examples of thermoplastic polyurethane compounds of various embodiments of the disclosed invention are provided.

Table 2 below identifies ingredients and their sources for the thermoplastic polyurethane compounds of the Examples.

TABLE 2

| Ingredient Description | Brand | Source |
|---|---|---|
| Aromatic polycaprolactone TPU | PEARLTHANE 11T85 | Lubrizol |
| Aromatic polycaprolactone TPU | ESTANE 2102-90A | Lubrizol |
| Aromatic polycaprolactone TPU | ESTANE 2102-55D | Lubrizol |
| Aliphatic polycaprolactone TPU | KRYSTALGRAN PN03-221 | Huntsman |
| Aliphatic polycaprolactone TPU | ESTANE 91F88EXP | Lubrizol |
| Aliphatic polycaprolactone TPU | ESTANE ALR CL90-EXP | Lubrizol |
| Ultraviolet light absorber | TINUVIN 234 | BASF |
| Ultraviolet light absorber | TINUVIN 622 | BASF |
| Mold release wax | KEMAMIDE B | PMC Biogenix |
| Antioxidant | IRGASTAB FS301 | BASF |

To prepare the Examples, the ingredients all together were compounded and extruded as pellets on a twin screw extruder at 196° C. and 300 rpm. Subsequently, the extruded pellets were injection molded (barrel temperature at 205° C. and molder temperature at 25° C.) into specimen plaques having dimensions of 150×125×1.5 mm and evaluated for the reported properties.

Table 3 below shows the formulations and certain properties of Comparative Examples A to B and Examples 1 to 2.

TABLE 3

| | Example | | | |
|---|---|---|---|---|
| | A | B | 1 | 2 |
| Ingredients | Wt. Parts | | | |
| PEARLTHANE 11T85 | 100.00 | 100 | 85 | 70 |
| ESTANE 2102-90A | — | — | — | — |
| ESTANE 2102-55D | — | — | — | — |
| KRYSTALGRAN PN03-221 | — | — | 15 | 30 |
| ESTANE 91F88EXP | — | — | — | — |
| ESTANE ALR CL90-EXP | — | — | — | — |
| TINUVIN 234 | — | 0.6 | 0.6 | 0.6 |
| TINUVIN 622 | — | 0.3 | 0.3 | 0.3 |
| KEMAMIDE B | 0.1 | 0.1 | 0.1 | 0.1 |
| IRGASTAB FS301 | 0.15 | 0.15 | 0.15 | 0.15 |
| TOTAL | 100.25 | 101.15 | 101.15 | 101.15 |
| Properties | | | | |
| Hardness (Shore A) | 82 | 82 | 78 | 73 |
| Blue Jean Abrasion Test | 1 | 1 | 1 | 1 |
| Clarity (Visual Observation) | 1 | 1 | 1 | 1 |
| QUV Test, Delta E | 26 | 6 | 2.3 | 1.6 |
| QUV Test, Yellow Index | 36 | 8.7 | 3.3 | 2.3 |

Table 4 below shows the formulations and certain properties of Examples 3 to 6.

TABLE 4

| | Example | | | |
|---|---|---|---|---|
| | 3 | 4 | 5 | 6 |
| Ingredients | Wt. Parts | | | |
| PEARLTHANE 11T85 | 85 | 70 | 85 | 70 |
| ESTANE 2102-90A | — | — | — | — |
| ESTANE 2102-55D | — | — | — | — |
| KRYSTALGRAN PN03-221 | — | — | — | — |

TABLE 4-continued

| Ingredients | Example 3 | 4 Wt. Parts | 5 | 6 |
|---|---|---|---|---|
| ESTANE 91F88EXP | 15 | 30 | — | — |
| ESTANE ALR CL90-EXP | — | — | 15 | 30 |
| TINUVIN 234 | 0.6 | 0.6 | 0.6 | 0.6 |
| TINUVIN 622 | 0.3 | 0.3 | 0.3 | 0.3 |
| KEMAMIDE B | 0.1 | 0.1 | 0.1 | 0.1 |
| IRGASTAB FS301 | 0.15 | 0.15 | 0.15 | 0.15 |
| TOTAL | 101.15 | 101.15 | 101.15 | 101.15 |
| Properties | | | | |
| Hardness (Shore A) | 81 | 71 | 81 | 77 |
| Blue Jean Abrasion Test | 1 | 1 | 1 | 1 |
| Clarity (Visual Observation) | 1 | 1 | 1 | 1 |
| QUV Test, Delta E | — | — | — | — |
| QUV Test, Yellow Index | — | — | — | — |

Table 5 below shows the formulations and certain properties of Comparative Example C and Examples 7 to 8.

TABLE 5

| Ingredients | Example C | 7 Wt. Parts | 8 |
|---|---|---|---|
| PEARLTHANE 11T85 | — | — | — |
| ESTANE 2102-90A | 100 | 85 | 70 |
| ESTANE 2102-55D | — | — | — |
| KRYSTALGRAN PN03-221 | — | 15 | 30 |
| ESTANE 91F88EXP | — | — | — |
| ESTANE ALR CL90-EXP | — | — | — |
| TINUVIN 234 | 0.6 | 0.6 | 0.6 |
| TINUVIN 622 | 0.3 | 0.3 | 0.3 |
| KEMAMIDE B | 0.1 | 0.1 | 0.1 |
| IRGASTAB FS301 | 0.15 | 0.15 | 0.15 |
| TOTAL | 101.15 | 101.15 | 101.15 |
| Properties | | | |
| Hardness (Shore A) | 90 | 85 | 78 |
| Blue Jean Abrasion Test | 1 | 1 | 1 |
| Clarity (Visual Observation) | 1 | 1 | 1 |
| QUV Test, Delta E | 8.5 | 4.7 | 4.6 |
| QUV Test, Yellow Index | 12.3 | 6.8 | 6.6 |

Table 6 below shows the formulations and certain properties of Comparative Example D and Examples 9 to 10.

TABLE 6

| Ingredients | Example D | 9 Wt. Parts | 10 |
|---|---|---|---|
| PEARLTHANE 11T85 | — | — | — |
| ESTANE 2102-90A | — | — | — |
| ESTANE 2102-55D | 100 | 85 | 70 |
| KRYSTALGRAN PN03-221 | — | 15 | 30 |
| ESTANE 91F88EXP | — | — | — |
| ESTANE ALR CL90-EXP | — | — | — |
| TINUVIN 234 | 0.6 | 0.6 | 0.6 |
| TINUVIN 622 | 0.3 | 0.3 | 0.3 |
| KEMAMIDE B | 0.1 | 0.1 | 0.1 |
| IRGASTAB FS301 | 0.15 | 0.15 | 0.15 |
| TOTAL | 101.15 | 101.15 | 101.15 |
| Properties | | | |
| Hardness (Shore A) | 91 | 86 | 85 |
| Blue Jean Abrasion Test | 1 | 1 | 1 |
| Clarity (Visual Observation) | 1 | 1 | 1 |
| QUV Test, Delta E | 14.8 | 5.4 | 2.6 |
| QUV Test, Yellow Index | 21.3 | 7.9 | 3.7 |

Without undue experimentation, those having ordinary skill in the art can utilize the written description, including the Examples, to make and use aspects of the disclosed invention.

All documents cited in the Embodiments of the Invention are incorporated herein by reference in their entirety unless otherwise specified. The citation of any document is not to be construed as an admission that it is prior art with respect to the disclosed invention.

While particular embodiments of the disclosed invention have been illustrated and described, it would be obvious to those skilled in the art that various other changes and modifications can be made without departing from the spirit and scope of the invention. The appended claims are intended to cover all such changes and modifications within the scope of the disclosed invention.

What is claimed is:

1. A thermoplastic article molded from a thermoplastic polyurethane compound, the thermoplastic polyurethane compound comprising:
   100 parts by weight of thermoplastic polyurethane selected from blends of aromatic polycaprolactone thermoplastic polyurethane and aliphatic polycaprolactone thermoplastic polyurethane, wherein at least about 50 parts by weight is the aromatic polycaprolactone thermoplastic polyurethane,
   a secondary polymer in an amount of not more than 200 parts by weight, wherein the secondary polymer is selected from thermoplastic vulcanizates, polyolefin elastomers, copolyesters, and combinations thereof
   wherein the thermoplastic article, after subjected to QUV Test, achieves a Yellow Index of less than about 8.5:
   wherein the thermoplastic article is a protective case or portion thereof for a handheld electronic device.

2. The thermoplastic article of claim 1, wherein from about 60 to about 90 parts by weight is the aromatic polycaprolactone thermoplastic polyurethane and from about 10 to about 40 parts by weight is the aliphatic polycaprolactone thermoplastic polyurethane.

3. The thermoplastic article of claim 1, wherein the thermoplastic polyurethane compound further comprises additives selected from antioxidants and stabilizers; colorants; mold release agents; processing aids; ultraviolet light absorbers; and combinations thereof.

4. The thermoplastic article of claim 1, wherein the thermoplastic polyurethane compound further comprises plasticizer.

5. The thermoplastic article of claim 1, wherein the thermoplastic polyurethane compound is free of other aromatic thermoplastic polyurethane selected from aromatic polyester thermoplastic polyurethane, aromatic polyether thermoplastic polyurethane, and combinations thereof.

6. The thermoplastic article of claim 1, wherein the thermoplastic polyurethane compound is free of other aliphatic thermoplastic polyurethane selected from aliphatic polyester thermoplastic polyurethane, aliphatic polyether thermoplastic polyurethane, and combinations thereof.

7. The thermoplastic article of claim 1:
wherein the thermoplastic article, after subjected to QUV Test, achieves (a) a Delta E lower than a comparative Delta E, and (b) a Yellow Index lower than a comparative Yellow Index;
wherein a comparative thermoplastic article, after subjected to QUV Test, achieves the comparative Delta E and the comparative Yellow Index, and the comparative thermoplastic article is molded from a comparative thermoplastic polyurethane compound; and
wherein the comparative thermoplastic polyurethane compound is identical to the thermoplastic polyurethane compound, except that the comparative thermoplastic polyurethane compound includes 100 parts by weight of thermoplastic polyurethane selected from aromatic polycaprolactone thermoplastic polyurethane.

8. The thermoplastic article of claim 1:
wherein the thermoplastic polyurethane compound further comprises from about 0.1 to about 2 parts by weight of ultraviolet light absorber; and
wherein the thermoplastic article, after subjected to QUV Test, achieves a Delta E of less than about 5.5 and a Yellow Index of less than about 7.5.

9. The thermoplastic article of claim 1, wherein the thermoplastic article achieves a rating of 1 according to Blue Jean Abrasion Test.

10. An overmolded article comprising:
(a) an overmold portion comprising a thermoplastic polyurethane compound, the thermoplastic polyurethane compound comprising:
100 parts by weight of thermoplastic polyurethane selected from blends of aromatic polycaprolactone thermoplastic polyurethane and aliphatic polycaprolactone thermoplastic polyurethane, wherein at least about 50 parts by weight is the aromatic polycaprolactone thermoplastic polyurethane,
a secondary polymer in an amount of not more than 200 parts by weight, wherein the secondary polymer is selected from thermoplastic vulcanizates, polyolefin elastomers, copolyesters, and combinations thereof; and
(b) a substrate portion molded from a thermoplastic resin compound;
wherein the overmold portion is bonded onto the substrate portion at a bond interface, and the bond interface is free of adhesive;
wherein the overmold portion, after subjected to QUV Test, achieves a Yellow Index of less than about 8.5; and
wherein the overmolded article is a protective case or portion thereof for a handheld electronic device.

11. A method of improving stability against ultraviolet light exposure by a thermoplastic articlemolded from a thermoplastic polyurethane compound including 100 parts by weight of thermoplastic polyurethane, the method comprising the step of selecting the thermoplastic polyurethane from blends of aromatic polycaprolactone thermoplastic polyurethane and aliphatic polycaprolactone thermoplastic polyurethane, wherein at least about 50 parts by weight is the aromatic polycaprolactone thermoplastic polyurethane, and a secondary polymer in an amount of not more than 200 parts by weight, wherein the secondary polymer is selected from thermoplastic vulcanizates, polyolefin elastomers, copolyesters, and combinations thereof; and
wherein the thermoplastic article, after subjected to QUV Test, achieves Yellow Index of less than about 8.5; and
wherein the thermoplastic article is a protective case or portion thereof for a handheld electronic device.

12. The method of claim 11, wherein from about 60 to about 90 parts by weight is the aromatic polycaprolactone thermoplastic polyurethane and from about 10 to about 40 parts by weight is the aliphatic polycaprolactone thermoplastic polyurethane.

13. The method of claim 11:
wherein the thermoplastic article, after subjected to QUV Test, achieves (a) a Delta E lower than a comparative Delta E, and (b) a Yellow Index lower than a comparative Yellow Index;
wherein a comparative thermoplastic article, after subjected to QUV Test, achieves the comparative Delta E and the comparative Yellow Index, and the comparative thermoplastic article is molded from a comparative thermoplastic polyurethane compound; and
wherein the comparative thermoplastic polyurethane compound is identical to the thermoplastic polyurethane compound, except that the comparative thermoplastic polyurethane compound includes 100 parts by weight of thermoplastic polyurethane selected from aromatic polycaprolactone thermoplastic polyurethane.

14. The method of claim 11:
wherein the thermoplastic polyurethane compound further includes from about 0.1 to about 2 parts by weight of ultraviolet light absorber; and
wherein the thermoplastic article, after subjected to QUV Test, achieves a Delta E of less than about 5.5 and a Yellow Index of less than about 7.5.

15. The method of claim 11, wherein the thermoplastic article achieves a rating of 1 according to Blue Jean Abrasion Test.

* * * * *